3,356,681
XANTHENYLPIPERAZINE ANTI-DEPRESSANTS
John W. Cusic, Skokie, and Peter Yonan, Chicago, Ill., assignors to G. D. Searle & Co., Chicago, Ill., a corporation of Delaware
No Drawing. Filed July 22, 1966, Ser. No. 567,041
5 Claims. (Cl. 260—268)

ABSTRACT OF THE DISCLOSURE

The present 1-(phenyl and benzyl)-4-(xanthenyl and thioxanthenyl)piperazines possess anti-depressant and anti-ulcer properties. They are prepared by the reaction of a xanhydrol or thioxanhydrol with an N-phenylpiperazine or N-benzylpiperazine.

---

The present application is a continuation-in-part of application Serial No. 405,616, filed October 21, 1964, and now U.S. Patent 3,262,934.

The present invention relates to a group of compounds which are xanthenylpiperazine derivatives. In particular, the present invention relates to a group of compounds having the following general formula

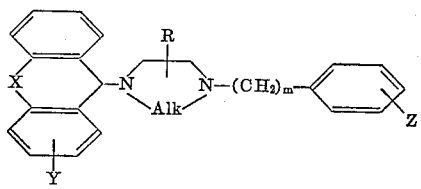

wherein $m$ is 0 or 1; R is selected from the group consisting of hydrogen and methyl; Alk is selected from the group consisting of ethylene, propylene, and trimethylene; X is selected from the group consisting of O and S; Y is selected from the group consisting of hydrogen, chlorine, and methyl; and Z is selected from the group consisting of hydrogen, methyl, halogen, and methoxy. The halogens referred to above include fluorine, chlorine, bromine, and iodine.

The compounds of the present invention are conveniently prepared by the reaction of xanthydrol or thioxanthydrol with an appropriate N-phenylpiperazine or N-benzylpiperazine. The reaction is conveniently carried out at reflux in an inert solvent in the presence of a weak acid. Toluene is a particularly useful solvent for this reaction, although benzene and xylene are examples of other solvents which can be used for this purpose. A weak acid such as acetic acid can be used to catalyze the reaction. In addition, it is useful to carry out the reaction in an apparatus equipped with a water trap so that water can be removed from the reaction mixture as it is formed.

The compounds of the present invention are useful because of their valuable pharmacological properties. In particularl, they are active as anti-depressants. Thus, they have been found to antagonize the effects of reserpine and reserpine-like compounds as demonstrated by their antagonism of ptosis induced in mice by such agents. The anti-depressant activity of the present compounds is further of particular interest because, although these compounds are anti-depressants and also possess some anti-ulcer activity, they appear to have few, if any, side effects. The occurrence of side effects is a common drawback of currently useful anti-depressants.

The compounds of this invention can be administered in various forms such as tablets, capsules, suspensions, and solutions, a well a other commonly employed forms which are particularly suited for the purpose of oral administration. These forms can consist of a xanthenylpiperazine of the chemical formula described above and vehicles and excipients normally used for pharmaceutical preparations. Suitable excipients and vehicles for use in the preparation of these medicaments include corn starch, sucrose, calcium phosphate, polymethacrylic acid, polyvinylpyrrolidone, microcrystalline cellulose, magnesium stearate, corn oil, cocoa butter, acacia, talc, and lactose, as well as other fillers, binders, disintegrants, lubricants, and bases commonly employed in the preparation of medicaments ready for use. The material of the appropriate composition can be compressed into tablets of the appropriate size or it can be filled by hand or machine into opaque, hard, gelatin capsules of the appropriate size. Solutions can be prepared by dissolving the appropriate amount of one of the active compounds in a pharmaceutically acceptable liquid in which it is soluble.

The following examples are presented to further illustrate the present invention; they should not be construed as limiting it in spirit or in scope. In these examples, quantities are indicated in parts by weight and temperatures in degrees centigrade (° C.).

Example 1

A mixture of 10 parts of xanthydrol, 8 parts of 1-phenylpiperazine, 4.5 parts of glacial acetic acid and 155 parts of toluene is refluxed for 17 hours in an apparatus equipped with a water trap. The solvent is evaporated from the resultant solution at reduced pressure to leave a residual crystalline solid. This is recrystallized from a mixture of chloroform and ether to give 1-phenyl-4-(9-xanthenyl)piperazine melting at about 194–195° C. This compound has the following formula

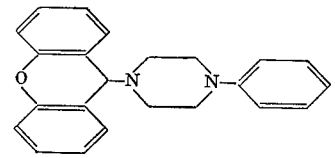

Example 2

Thioxanthydrol, 2-chloroxanthydrol, and 4 - methylxanthydrol are each reacted with 1-phenylpiperazine according to the procedure described in Example 1. The respective products obtained are 1 - phenyl-4-(9 - thioxanthenyl)piperazine, 1-phenyl-4-(2-chloro - 9 - xanthenyl)piperazine, and 1-phenyl-4-(4-methyl - 9 - xanthenyl)piperazine.

Example 3

1-phenyl-2-methylpiperazine, 1-phenylhomopiperazine, 1-(4-tolyl)piperazine, 1-(4-fluorophenyl)piperazine, 1-(4-chlorophenyl)piperazine, 1-(3-chlorophenyl)piperazine, 1-(4-bromophenyl)piperazine, and 1 - (4 - methoxyphenyl)piperazine are each reacted with xanthydrol according to the procedure described in Example 1 to give the corresponding substituted compound in each instance.

Example 4

An aqueous solution of 25 parts of 1-benzylpiperazine dihydrochloride is made alkaline with potassium carbonate. The mixture is then extracted with 260 parts of toluene and to the resultant toluene solution is added 15 parts of xanthydrol and 8 parts of glacial acetic acid. The resultant solution is refluxed for 16 hours in an apparatus equipped with a water trap. The resultant solution is treated with charcoal and filtered hot and the solvent is evaporated from the filtrate to leave a residual solid. This is recrystallized twice from hexane to give 1-benzyl-4-(9-xanthenyl)piperazine melting at about 117–118° C.

What is claimed is:

1. A compound of the formula

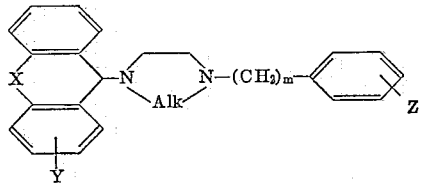

wherein $m$ is a whole number between 0 and 1 inclusive; Alk is selected from the group consisting of ethylene, propylene, and trimethylene; X is selected from the group consisting of O and S; Y is selected from the group consisting of hydrogen, chlorine, and methyl; and Z is selected from the group consisting of hydrogen, methyl, halogen, and methoxy.

2. A compound according to claim 1 which is 1-phenyl-4-(9-xanthenyl)piperazine.
3. A compound according to claim 1 which is 1-phenyl-4-(9-thioxanthenyl)piperazine.
4. A compound according to claim 1 which is 1-phenyl-4-(2-chloro-9-xanthenyl)piperazine.
5. A compound according to claim 1 which is 1-benzyl-4-(9-xanthenyl)piperazine.

References Cited

UNITED STATES PATENTS 3,167,541   1/1965   Van der Stelt _____ 260—268

OTHER REFERENCES

Villanti et al.: J. Med. and Pharm. Chem., vol. 5, No. 2 (1962), pp. 373–74.

HENRY R. JILES, *Primary Examiner.*